United States Patent [19]

Natalevich et al.

[11] Patent Number: 4,867,661

[45] Date of Patent: Sep. 19, 1989

[54] MOLD FOR MAKING ANNULAR POLYMERIC ARTICLES

[76] Inventors: Alexandr N. Natalevich, ulitsa P.Glebki, 82, kv. 158; Alexei G. Bondarenko, Leninsky prospekt 157, kv. 243; Anatoly T. Skoibeda, ulitsa Kuznechnaya, 3, kv. 39; Leonid G. Trofimov, ulitsa Miroshnichenko, 19, kv. 27, all of Minsk; Alexandr A. Yatsuk, ulitsa Mira, 66, kv. 42, Orsha; Alexandr S. Kholmovsky, ulitsa Minskaya, 63, kv. 88, Bobruisk; Andrei N. Nikonchuk, ulitsa Vostochnaya, 50, kv. 455, Minsk, all of U.S.S.R.

[21] Appl. No.: 879,379

[22] Filed: Jun. 27, 1986

[51] Int. Cl.$^4$ ............................................. B29C 33/20
[52] U.S. Cl. ................................. 425/34.2; 249/122; 249/161; 425/812
[58] Field of Search ...................... 425/28 R, 218, 812, 425/34 B, 28 B, 34.2, 812; 249/161, 122

[56] References Cited

U.S. PATENT DOCUMENTS

| | | | |
|---|---|---|---|
| 1,315,805 | 9/1919 | Walsh | 249/161 |
| 1,549,961 | 8/1925 | Buckbee | 425/28 B |
| 1,806,848 | 5/1931 | Fullilove | 249/161 |
| 2,600,775 | 6/1952 | Hurry et al. | 425/34 B |
| 2,643,620 | 6/1953 | Miller | 425/149 |
| 2,980,248 | 4/1961 | Ettbring | 249/161 |
| 4,207,052 | 6/1980 | Satzler | 425/28 B |
| 4,263,083 | 4/1981 | Schleiger | 425/28 B |
| 4,431,047 | 2/1984 | Takeshima et al. | 425/812 |
| 4,492,554 | 1/1985 | Carter | 425/812 |
| 4,510,113 | 4/1985 | Takano et al. | 425/28 B |

FOREIGN PATENT DOCUMENTS

| | | | |
|---|---|---|---|
| 2032869 | 1/1972 | Fed. Rep. of Germany | 425/34 B |
| 874386 | 10/1981 | U.S.S.R. | |
| 905111 | 2/1982 | U.S.S.R. | |

Primary Examiner—Willard E. Hoag

[57] ABSTRACT

A mold for making annular polymeric articles comprising a core having an outer contoured surface for placing a workpiece thereon, two half-molds with holes for discharging excess polymer embracing the contoured surface of the core and partially embracing end faces of the core in the course of radial displacement of the half-molds during press-forming of the article, and a means for pressure-sealing a forming cavity of the mold. The half-molds have in the area where they are joined a width equal to the length of the generating line of the core, whereas the pressure-sealing means includes two members rigidly affixed on one of the half-molds at the opposite sides thereof. Each member has at the side facing the half-molds the form of a closure embracing these half-molds in the area where they are joined, and by their shelves embracing part of the end faces of the half-molds and core during press-forming.

2 Claims, 3 Drawing Sheets

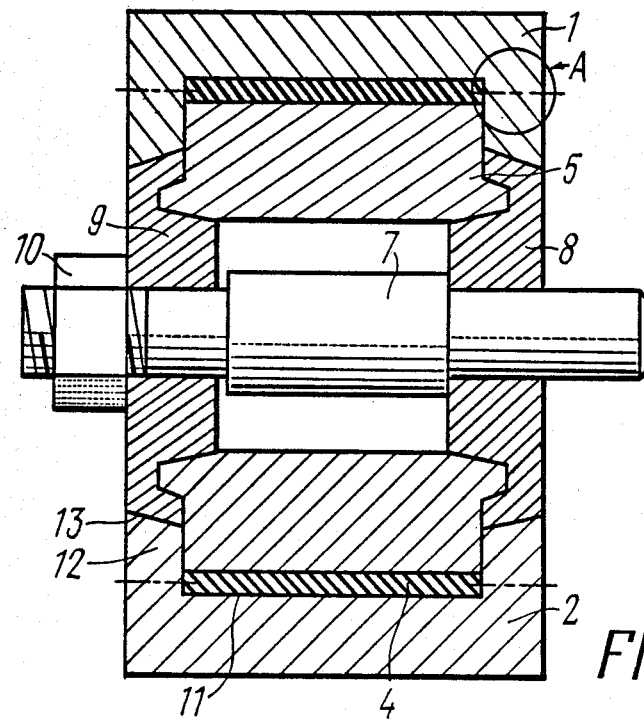
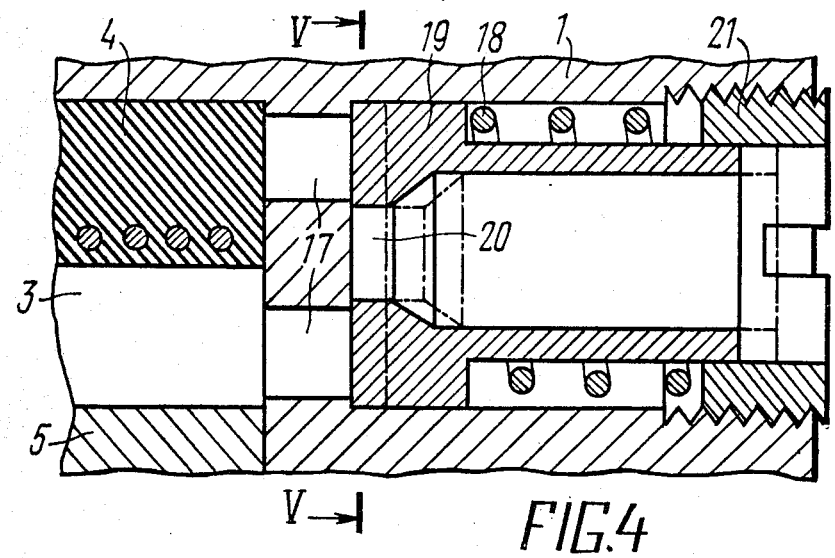

MOLD FOR MAKING ANNULAR POLYMERIC ARTICLES

FIELD OF THE INVENTION

This invention relates generally to the manufacture of rubber articles, and more particularly to molds for making annular polymeric articles.

The invention is most suitable for use in making flat enless toothed belts.

Other possible applications include fabrication of a range of annular articles from polymer materials.

PRIOR ART

There is known a mold for making tubular elastic shells comprising a core having annular inserts with forming surfaces for placing a workpiece thereon, two half-molds, and seal elements for pressure-sealing the forming interior or cavity of the mold. The seal elements have the form of grooves provided in the plane where the half-molds are joined close to the core and extending along the generating line of the core. Seals of similar type are provided at the forming planes of the annular inserts. The core is centrally aligned relative to the half-molds, by means of the tapered surfaces of the inserts received by the corresponding grooves of the half-molds (cf., USSR Inventor's Certificate No. 874,386, published 1981 in Bulletin No. 39).

However, complete pressure-sealing of the forming interior in this mold is impossible because during radially drawing the half-molds together the polymer material fills the sealing grooves and continues to escape through a clearance between the joint planes of the half-molds. Therefore, by the point when the joint of the half-molds closes no sufficient pressure in the forming interior of the mold is attained for press-forming workpieces of complex configuration, especially when making use of a lining fabric.

There is also known a mold for making hollow polymeric articles comprising two half-molds and a composite core held in an assembled position by locks and a central rod. the core has an outer contoured surface on which a workpiece is placed. The core is centrally aligned relative to the half-molds by virtue of tapered inserts provided at the end faces of the central rod and core and cooperating with tapered holes in the half-molds when the latter are drawn together. The forming interior is pressure-sealed along its sides at the joint between the half-molds du to the provision in one half-mold of a recess and in the other half-molde of a lug entering this recess. At the ends the forming interior is sealed by the tapered inserts of the core engageable with the respective holes of the half-molds (cf., USSR Inventor's Certificate No. 905,111, published in 1982 in Bulletin No. 6).

One disadvantage of the above mold is insufficient pressure-sealing of its forming interior, especially at the initial point of the press-forming process, when the polymer material tends to flow outside through clearances between the planes of the half-molds and inserts with the holes. By the time complete pressure-sealing is attained the press-forming procedure ends, and therefore the pressure developed in the forming interior is not sufficient for accurately reproducing the shape of the article.

SUMMARY OF THE INVENTION

It is therefore an object of the present invention to provide a mold for making annular polymeric articles capable of fabricating articles of higher quality.

The aims of the invention are attained by that in a mold for making annular polymeric articles comprising a core having an outer contoured surface for accommodating a workpiece thereon, two half-molds having holes for discharging excess polymer material embracing the contoured surface and partially embracing end faces of the core during press-forming of the article, and a means for pressure-sealing a forming interior of the mold, according to the invention, the half-molds have in the area where they are joined a width equal to the length of the generating line of the core, whereas the means for pressure-sealing the forming interior includes two members rigidly affixed to one of the half-molds at the opposite sides thereof and having at the side facing the half-molds the form of a closure embracing these half-molds in the area where they are joined, and by their projections embracing part of the end faces of the half-molds and core in the course of the press-forming process.

Preferably, the holes for discharging excess polymer are provided in each of the half-molds at the end side thereof in the zone the article is formed: each hole for discharging exces spolymer being preferably closed by a spring-loaded plunger having a relief hole communicating in the open position of the pklunger with the hole for discharging excess polymer.

The provision of plungers in the holes for discharging excess polymer makes it possible to control the compacting pressure in the forming interior of the mold and thus provide optimized conditions for obtaining high-quality polymeric articles.

The mold for making annular polymeric articles embodying the present invention, while being structurally simple, ensures complete pressure-sealing of the forming interior in the course of making polymeric articles to result in a higher quality of the end products.

BRIEF DESCRIPTION OF THE DRAWINGS

FIG. 3 is a section taken along the line III—III in FIG. 1;

FIG. 4 shows a hole for discharging excess polymer and a plunger in a longitudinal section.

DETAILED DESCRIPTION OF THE INVENTION

Figure 1:
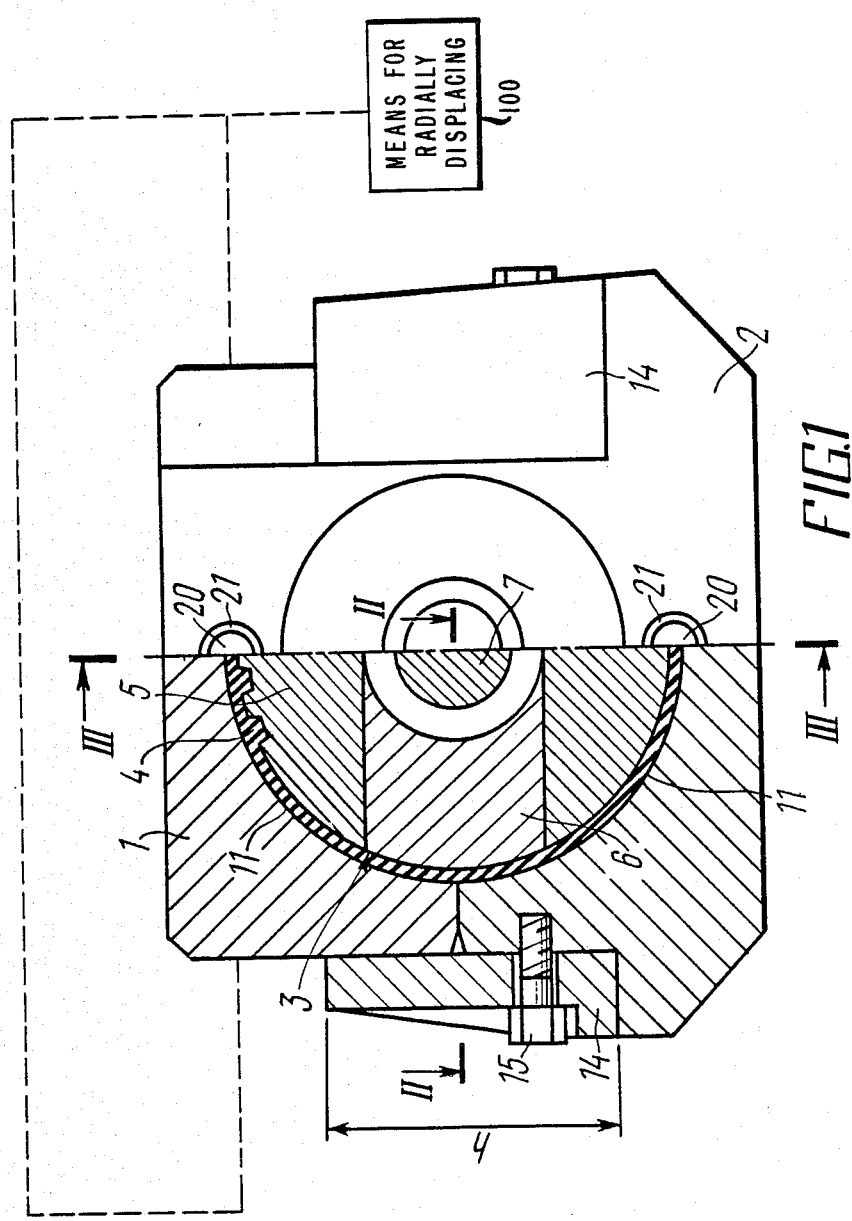
FIG. 1 is a longitudinal sectional view of one hal foa mold for making annular polymeric articles.

A mold for making toothed belts from polymer materials comprises two half-molds (FIG. 1) and 2, and a core 3 having an outer contoured toothed surface on which a workpiece 4 is placed, the workpiece comprising a lining fabric, a carrying cord, and polymer (the materials making up the workpiece not being shown in the drawings).

Figure 2:
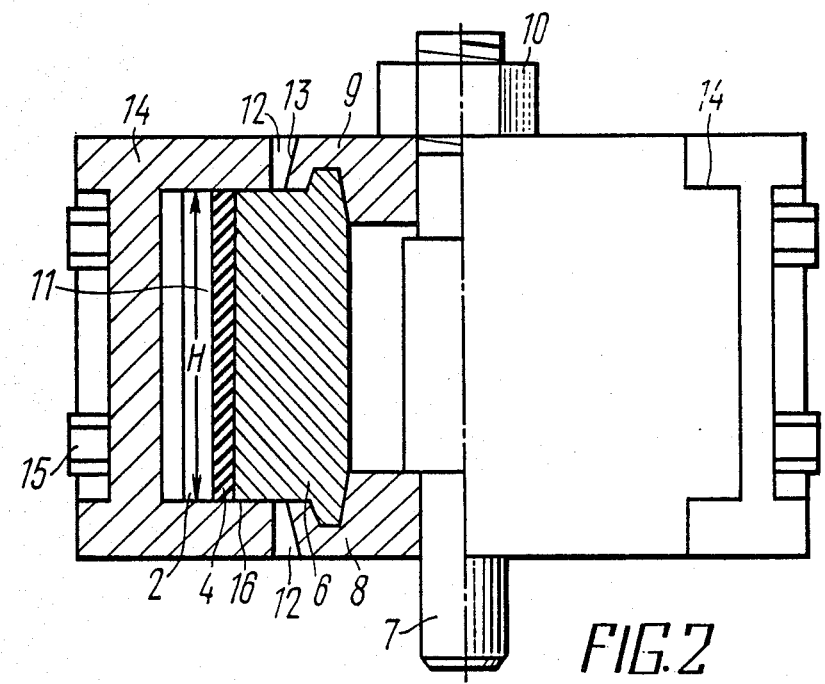
FIG. 2 is a section taken along the line II—II in FIG. 1.

The core 3 includes two longitudinally extending sectors 5 and 6 assembled on a central shaft 7 and held in the assembled state by cover plates 8 (FIG. 2) and 9 drawn together by a nut 10.

The half-molds 1 and 2 (FIG. 1) have inner cylindrical surfaces 11 by which they embrace the contoured surface of the core 3, and projections 12 (FIG. 3) adjoining by their inner surfaces the end face of the core 3; tapered end faces 13 adjoining corresponding tapered side faces of the cover plates 8 and 9. The engagement of the tapered surfaces 13 of the projections 12 of the half-molds 1 and 2 with the tapered side faces 8 and 9 of the core 3 ensures aligning of the core 3 relative to the forming cylindrical surface 11 of the half-molds I and 2.

In order to pressure-seal a forming interior or cavity defined by a space between the contoured surface of the core 3 and the forming cylindrical surface 11 of the half-molds 1 and 2, the half-molds 1 and 2 have at the outer side in the area where they are joined a width H (FIG. 2) equal to the length of the generating line of the core 3. Used as the sealing means are two members 14 rigidly secured by bolts 15 on the half-molds 2 at the opposite sides thereof and extending along the side faces of the half-molds 1 (FIG. 1) and 2 to overlap the joint. Each member 14 is fashioned at the side facing the half-molds 1, 2 as a closure, as seen best in FIG. 2. By its inner surface having a length equal to the width H (FIG. 2) of the half-molds 1, 2 (FIG. 1) the member 14 embraces the half-molds 1, 2 in the area where they are joined togehter, and by projections 16 it embraces part of the end faces of the half-molds 1 and 2 and the core 3 in the course of the press-forming process. The height h (FIG. 1) of the member 14 must be sufficient to overlap the joint of the half-moulds 1 and 2.

Provided in the projections 12 (FIG. 3) of the half-molds 1 and 2 at a distance furthest from the joint of the half-molds 1, 2 above the press-forming interior are holes 17 (FIG. 4) serving to discharge excess polymer from this interior. The location of these holes 17 is indicated in FIG. 3 by the circle A.

Figure 5:
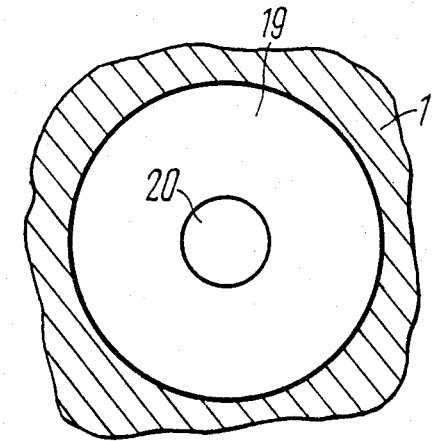
FIG. 5 is a section taken along the line V—V in FIG. 4.

In the embodiment being described each half-mold 1, 2 has two closely spaced holes 17 (FIG. 4). The holes 17 are closed by a plunger 19 spring-loaded by a spring 18. The plunger 19 (FIGS. 4 and 5) has a central relief hole 20 communicable with the holes 17 (FIG. 4) when the plunger 19 is open.

The force of the spring 18 is adjusted by a screw plug 21.

The mold according to the invention operates in the following manner.

Placed on the assembled core 3 is a lining fabric, after which a carrying cord is wound and a layer of polymer is applied thereto. The core 3 with the workpiece 4 is then placed in the lower half-mold 2 so that it could enter by its end faces a space confined by the inner surface of the shelf 12 of the half-mold 2. The weight of the core 3 with the workpiece 4 makes it partially lower into this space to align coaxially with the forming cylindrical surface 11 in the bottom half-mold 2. The upper half-mold 1 is then mounted on top of the core 3 with the workpiece 4 of the bottom half-mold 2 so that it could enter by its side surface the interior of the closures of the members 14 rigidly affixed on the bottom half-mold 2 at its two opposite sides. This is accomplished by means 100 for radially displacing the half-molds. The top half-mold 1 partially embraces by the inner surfaces of the projections 12 the end faces of the core 3. The members 14 overlap the joint of the half-molds 1 and 2 and partially the core 3. In this manner the core 3 with the workpiece 4 occupies the forming interior. The holes 17 for discharging excess polymer is closed by the plungers 18. In this state the mold is accommodated between the plates of a vulcanizing press to draw the top and bottom half-molds together to result in their movement in the radial on. As the half-molds are drawn closer together, the core 3 aligns centrally relative to their forming cylindrical surface thanks to the cooperation of the tapered surfaces of the cover plates 8 and 9 and tapered surface 13 of the projections 12. The pressure of polymer inside the pressure-tight forming interior grows to its optimum, thereby ensuring uniform elongation of the lining fabric tending to follow the contour of the core 3 accompanied by occupation of the contour of the workpiece by the polymer material. Upon attaining the optimum pressure to which the spring-loaded plunger 19 is adjusted, the mixture of polymer and gaseous substances flows through the holes 17 for discharging excess polymer, moves the plunger 19 and escapes through the relief hole 20 outside as waste. As a result of discharging excess polymer and gaseous substances, the pressure inside the pressure-tight forming interior again drops to the optimum value for the plungers 19 to close the holes 17 for discharging excess polymer and thus maintain therein a pressure of polymer ensuring a relatively high quality press-forming. After the top and bottom half-molds 1 and 2 are joined, the volume of the forming interior is stabilized to terminate the escape of excess polymer, whereas the plungers 19, having closed the holes 17 for discharging excess polymer, maintain the pressure of polymer inside the pressure-tight forming interior until the vulcanizing process is terminated.

After vulcanizing the workpiece the press plates are drawn apart to be followed by remvoing the half-mold 1 and retrieving the core 3 with the finished product. Subsequent to disassembling the core 3, the article is removed therefrom to be later cut into pieces of required width.

Prior to a subsequent press-forming operation the holes 17 for discharging excess polymer and the central hole 20 are cleaned of the remnants of polymer. When changing the composition of the polymer or parameters of pressure-forming and vulcanization with the aim of obtaining an article of higher quality through providing an optimized pressure of polymer in the forming interior of the mold which would suit the new process conditions, the force required for opeingin the plunger 19 is adjusted by rotating the screw plug 21 acting on the spring 18.

The relatively simple construction of the proposed mold for making annular polymeric articles having a means for pressure-sealing the forming interior or mold cavity and provided with a means for adjusting the pressure inside the forming interior adapted for operation with a specifically viscous polymer materials makes it possible to control the process of molding and obtain high-quality polymeric articles.

Pilot models of the proposed mold are being tested. Toothed belts of 1.5, 2 and 3 mm modulus with a wear-resistant tooth lining have been fabricated. When tested in textile and stitchign machines, such belts served 4 to 6 times longer than belts without lining fabricated from polyurethane.

What is claimed is:
1. A mold for making annular polymeric articles comprising: a core having an outer cylindrical contoured surface for placing a workpiece thereon; two half-molds adjacent each other and capable of radial movement; said half-molds embracing the outer cylindrical contoured surface and partially embracing end faces of said core defining a mold cavity therebetween during their radial displacement in the course of press-forming of the article and mutually abuttable along a joint; a means for radially displacing said half-molds; said half-molds having at the joint a width equal to the height of said core; two members rigidly secured on one of said half-molds at the opposite sides thereof, extending along the joint between said half-molds and seving to pressure-seal the joint; each of said members having on the side facing said half-molds the form of a closure embracing said half-molds at the joint area thereof; projections of the members overlapping part of end faces of said half-molds and said core in the course of press-forming of the article; and holes for discharging excess polymer made in said half-molds.

2. A mold as defined in claim 1, in which the holes for discharging excess polymer are provided in each of the half-moulds at the end side thereof in the zone where the articles is formed, each hole for discharging excess polymer being closed by a spring-loaded plunger having a relief hole communicating in the open position of the plunger with the hole for discharging excess polymer.

* * * * *